(12) United States Patent
Ledzius et al.

(10) Patent No.: US 6,539,438 B1
(45) Date of Patent: Mar. 25, 2003

(54) RECONFIGURABLE COMPUTING SYSTEM AND METHOD AND APPARATUS EMPLOYING SAME

(75) Inventors: Robert C. Ledzius, Austin, TX (US); James L. Flemmons, Round Rock, TX (US); Lawrence R. Maturo, Austin, TX (US)

(73) Assignee: Quickflex Inc., Austin, TX (US)

( * ) Notice: Subject to any disclaimer, the term of this patent is extended or adjusted under 35 U.S.C. 154(b) by 0 days.

(21) Appl. No.: 09/232,292

(22) Filed: Jan. 15, 1999

(51) Int. Cl.[7] .................................................. G06F 3/00
(52) U.S. Cl. ............................... 710/8; 710/16; 710/19; 710/36; 709/301; 709/302; 713/2
(58) Field of Search ............................... 710/36, 8, 16, 710/19; 709/301, 302; 713/2

(56) References Cited

U.S. PATENT DOCUMENTS

| | | | |
|---|---|---|---|
| 5,497,498 A | | 3/1996 | Taylor ........................ 395/800 |
| 5,535,342 A | | 7/1996 | Taylor ........................ 395/307 |
| 5,539,330 A | * | 7/1996 | McDermid ................... 326/39 |
| 5,583,749 A | | 12/1996 | Tredennick et al. ........ 361/790 |
| 5,603,043 A | | 2/1997 | Taylor et al. ............... 395/800 |
| 5,628,028 A | | 5/1997 | Michelson ................... 395/828 |
| 5,784,636 A | | 7/1998 | Rupp ..................... 395/800.37 |
| 5,788,669 A | * | 8/1998 | Peterson ...................... 604/65 |
| 5,794,062 A | | 8/1998 | Baxter ..................... 395/800.3 |
| 5,991,822 A | * | 11/1999 | Mealey et al. .............. 709/301 |
| 5,999,990 A | * | 12/1999 | Sharrit et al. ............... 709/103 |
| 6,185,484 B1 | * | 2/2001 | Rhinehart ...................... 701/1 |
| 6,230,307 B1 | * | 5/2001 | Davis et al. ................... 326/37 |

OTHER PUBLICATIONS

Casselman, "Virtual computing and the virtual computer," IEEE Workshop on FPGAs for Custom Computing Machines, Apr. 5–7, 1993.

Casselman, "FPGA–based transformable computers for fast digital signal processing," The University of British Columbia, Department of Electrical Engineering, 1995.

BYU Reconfigurable Logic Lab Home Page.htm and Papers1.html, BYU Configurable Computing Lab home page.

Singh, et al., "Expressing dynamic reconfiguration by partial evaluation," Department of Computing Science, University of Glasgow, 1996.

(List continued on next page.)

*Primary Examiner*—Jeffrey Gaffin
*Assistant Examiner*—Rehana Perveen
(74) *Attorney, Agent, or Firm*—Vinson & Elkins L.L.P.

(57) ABSTRACT

A reconfigurable computing system and method of use are provided for interfacing a plurality of application programs running on a host system to one or more hardware objects defined in one or more configuration files. The system includes reconfigurable computing circuitry comprising flexibly configurable circuitry operable for interfacing and implementing one or more hardware objects with one or more of the application programs. The system further includes memory circuitry associated with the reconfigurable computing circuitry for system information storage, and communications interfaces for connecting the reconfigurable computing circuitry and the memory to the host computer. The flexibly configurable circuitry further comprises one or more FPGAs and one or more programmable logic devices ("PLDs"), SRAM and EEPROM memory, and all the necessary connectors and support circuitry. The reconfigurable computing system and method of the present invention can be implemented on either a PCMCIA platform, a PCI platform, or any other bus structure without changing the basic functionality and claimed functionality of the reconfigurable computing system. Additionally, the reconfigurable computing system and method of this invention are well suited to be implemented in a portable computing environment.

31 Claims, 13 Drawing Sheets

OTHER PUBLICATIONS

Burns, et al., "A dynamic reconfiguration run–time system," The Department of Computing Science, The University of Glasgow, 1997.

Casselman, et al., "Hardware object programming on the EVC1: a reconfigurable computer," 1995.

Ludwig, "Hades—fast hardware synthesis tools and a reconfigurable coprocessor," Swiss Federal Institute of Technology Zurich, 1997.

Villasenor, et al., "Configurable computing," Scientific American, Jun. 1997.

Casselman, et al., "Transformable computers," 8th International Parallel Processing Symposium Sponsored by IEEE Computer Society, Apr. 26–29, 1994.

* cited by examiner

FIG. 3A

| ADDRESS LOCATION: | ATTRIBUTE MEMORY: | COMMON MEMORY: | |
|---|---|---|---|
| $100FE<br>\|<br>$1008C<br>$1008A<br>$10088<br>$10086<br>$10084<br>$10082<br>$10080 | Reserved for Future QQT Expansion<br>\|<br>QQT Security Register<br>QQT Interrupt Flag Register<br>QQT Interrupt Enable Register<br>QQT Control Register<br>QQT Memory Register<br>QQT Configure Data Register<br>QQT Configure Control Register | | 60 |
| $1007E<br>\|<br>$10012<br>$10010<br>$1000E<br>$1000C<br>$1000A<br>$10008<br>$10006<br>$10004<br>$10002<br>$10000 | Reserved for Future Expansion<br>\|<br>I/O Limit (not implemented this version)<br>I/O Base 3 (not implemented this version)<br>I/O Base 2 (not implemented this version)<br>I/O Base 1 (not implemented this version)<br>I/O Base 0 (not implemented this version)<br>Extended Status Register<br>Socket and Copy Register (not implemented this version)<br>Pin Replacement Register<br>Configuration and Status Register<br>Configuration Option Register | | 62 |
| $0FFFF<br>o<br>o<br>o<br>$08000<br>$07FFF<br>o<br>o<br>o<br>$00000 | CIS uses only<br>even addresses<br><br>32k x 8 actual<br>attribute EEPROM storage<br>(EEPROM page 0) | Flash and SRAM Page access<br>Pages 0-$f shared space<br><br>SRAM page size: 64k x 16<br>EEPROM page size: 32k x 8<br>(EEPROM uses even addresses) | 64 |

FIG. 3B

| BIT #: | NAME: | DESCRIPTION: |
|---|---|---|
| 7 | SRESET | Software Reset. Setting this bit to one (1) places the Qard in the reset state. This bit is logically OR'ed to the HW RESET signal and provides a reset signal to the entire Qard with the exception of clearing the Quick Qard System Register $80 PWOK and ULCK bits which only a HW RESET can clear. This bit must be cleared by the software after software applies the signal prior to using the Qard, as this bit is not automatically cleared. |
| 6 | LevlReq | Level Mode IREQ#. Level Mode interrupts are selected when this bit is one. Pulse Mode Interrupts are selected when this bit is zero. FPGA configurations only design for level type IRQs and the PLD will translate the IRQ to the proper defined type if IREQ signal indicated by this bit for the host bus being used. |
| 5-0 | Conf Index | This 6-bit register is a read/write register used by PnP that does not have any HW functionality internal to the Qard design. |

FIG. 3D

| BIT #: | NAME: | DESCRIPTION: |
|---|---|---|
| 7-6 | Not Used | These bits are not writeable and return a 0 when read. |
| 5 | Crdy | CHANGED READY is set to one when the bit RREADY changes state. This bit may also be cleared by the host. |
| 4-2 | Not Used | These bits are not writeable and return a 0 when read. |
| 1 | Rrdy | CURRENT STATE OF READY represents the internal state of the READY signal. This bit reflects the state of READY (since the READY pin has been reallocated for use as Interrupt Request on I/O Cards). When this bit is set, the Crdy bit is also set. When cleared, the Crdy bit is unaffected. |
| 0 | Not Used | These bits are not writeable and return a 0 when read. |

FIG. 3C

| BIT #: | NAME: | DESCRIPTION: |
|---|---|---|
| 7 | Chng | STATUS CHANGE DETECTED: Since the Quick Qard is always configured for an I/O interface, this status bit triggers an assertion of the STSCHG# pin only when bit-6 of this register (SigChg) is also set. This bit can only be set by the Rready signal generated from an FPGA configuration or from one of the four (4) events triggered in the Extended Status Register (Event 0 = Cable Detect/NoDetect). Since no battery or write protect switch is implemented on the Quick Qard, the CBVD1, CBVD2 and CWProt have no effect on this bit. |
| 6 | SigChg | SIGNAL CHANGE ENABLE/DISABLE is set and reset by the host to enable and disable a status-change signal from the status register which asserts the STSCHG# pin when enabled. |
| 5 | IOis8 | This bit indicates if 16-bit transfers should be handled in 2 8-bit transfers and it is passed to the FPGA for hardware objects to utilize it. It is up to hardware object developers to decide if they want to handle both kinds of data transfers. Header file information will indicate if a configuration supports this option. Most likely, this bit will not be implemented and transfers will occur in 16 bit single transfers. |
| 4 | Reserved | Must always be 0. |
| 3 | Audio | AUDIO ENABLE enables audio information to be sent to the HBA via the speaker pin when set. |
| 2 | PwrDn | POWER DOWN is set to request that the card enter a power down state. This bit is passed to the FPGA and it is up to the application developer to utilize proper power down procedure. |
| 1 | Intr | INTERRUPT REQUEST PENDING represents the Qard's internal state of the interrupt request. This bit is cleared in a manner as indicated by the state of bit-0 IntrAck. Up to eight function interrupts may be implemented with the Quick Qard interrupt registers ($10088 and $1008a) which are logically ORed together to indicate this bit. When InterAck1, this bit can be cleared by writing a 0 to this bit. |
| 0 | IntrAck | INTERRUPT ACKNOWLEDGE determines the response of the Intr bit. It is recommended that all applications use this bit in the set or IntrAck=1 mode which causes the Intr bit to remain set even though the ISR has already serviced the interrupt. This allows interrupt sharing by allowing the support software to specifically clear the Intr bit after it is finished servicing the interrupt. If IntrAck=0, the Intr bit is cleared when the function clears the interrupt which does not require a clear of the Intr bit by writing to this register. |

FIG. 3E

| BIT #: | NAME: | DESCRIPTION: |
|---|---|---|
| 7 | CEvent3 | This bit is latched when a piggyback board event occurs. If the Eevent 3 is set, this bit will then cause the CHNG bit in the Card Configuration and Status register to be set. This bit may be cleared by writing a 1 to the bit. A write of 0 has no effect on this bit. |
| 6 | CEvent2 | This bit is latched when a FPGA defined event 2 occurs. If the Eevent 2 is set, this bit will then cause the CHNG bit in the Card Configuration and Status register to be set. This bit may be cleared by writing a 1 to the bit. A write of 0 has no effect on this bit. |
| 5 | CEvent1 | This bit is latched when a FPGA defined event 1 occurs. If the Eevent 1 is set, this bit will then cause the CHNG bit in the Card Configuration and Status register to be set. This bit may be cleared by writing a 1 to the bit. A write of 0 has no effect on this bit. |
| 4 | Ccable | This bit is latched when the cable is plugged in or unplugged. If the ECable is set, this bit will then cause the CHNG bit in the Card Configuration and Status register to be set. When a cable event is detected, bit 2 CABLE bit of register $10086 may be read to determine if the cable is attached or not. This bit may be cleared by writing a 1 to the bit. A write of 0 has no effect on this bit. |
| 3 | EEvent3 | Enables the Event 3 from the piggyback board to affect the CHNG bit in the Card Configuration and Status Register. |
| 2 | EEvent2 | Enables the Event 2 from the FPGA to affect the CHNG bit in the Card Configuration and Status Register. |
| 1 | EEvent1 | Enables the Event 1 from the FPGA to affect the CHNG bit in the Card Configuration and Status Register. |
| 0 | Ecable | Enables the Cable Event to affect the CHNG bit in the Card Configuration and Status Register. |

FIG. 3H

| BIT #: | NAME: | DESCRIPTION: |
|---|---|---|
| 7-3 | Test | FPGA JTAG Test Pins. |
| 2 | CBLE | CABLE indicates an external cable has been detected to be attached when set. |
| 1 | OCS1 | OSCILLATOR 1 Enable. |
| 0 | OSC0 | OSCILLATOR 0 Enable. |

FIG. 3F

| BIT #: 466 | NAME: 468 | DESCRIPTION: 470 |
|---|---|---|
| 7-6 | Not Used | These bits are not used, are not writeable and return a 0 when read. |
| 5 | nSTATUS | After an FPGA configuration process has begun, this bit can be read to determine if an error occurred in the configuration process prior to sending the next byte of information.<br>This bit will go high after the CBGN signal is applied and will remain high indicating that no configuration errors have occurred. If this bit goes low during a configuration process, a configuration error was detected and the configuration process must be reinitialized. |
| 4 | WAIT | The RDYnBSY signals from the FPGA is passed to this bit so that the host can determine when the FPGA is ready for the next configuration write data byte. |
| 3 | PRIV | PRIVATE when set indicates that current configuration of the card is a private configuration and cannot be used by other instances of a Quick Qard Driver. When cleared, the Page 0 SRAM can be interrogated to find out specific configuration file header information that may be used by other applications. This bit is set by the application which configured the Qard and can only be cleared by the CBGN (Configuration Begin) bit of this register. |
| 2 | CNFG | CONFIGURED is a read only bit that indicates that the Quick Qard has been configured and is ready for use. This bit is set automatically after a successful configuration and can only be cleared by the CBGN (Configuration Begin) bit of this register. This is a direct read of the DONE flag from the FPGA. |
| 1 | FCFG | FPGA CONFIG indicates when configuration process is occurring. This bit is set by the instance of the Driver that is configuring the Qard before it begins the configuration process and cleared by the same Driver instance once the process is completed. This bit is cleared by the CBGN (Configuration Begin) bit of this register. This bit directly drives the FPGA CS (Chip Select) for the configuration process. |
| 0 | CBGN | CONFIGURATION BEGIN applies a reset signal to the Qard's FPGA to begin a configuration sequence. It must be cleared also by the host after the time required by the FPGA. This signal is also set and cleared by a hardware or software reset, but differs from those signals since it does not affect any configuration register bits other than this FPGA Configuration Control Register. |

FIG. 3G

| BIT #: | NAME: | DESCRIPTION: |
|---|---|---|
| 7 | FFPS | This bit indicates if the specified PAGE is a Flash EEPROM page access (0) or a FPGA page access (1). EEPROM pages are from 0 to $f and FPGA access to SRAM pages may also be the same values, depending on the amount of SRAM specified to be on the Qard. FPGA Page $1x indicates that common memory access will be to Hardware Object Interface addresses. A Qard may contain up to 16 ($0-$f) separate hardware objects, each of which may be accessed by setting to the corresponding object page using the least significant 4 bits of this register. (SRAM accesses require the inclusion of an SRAM access function implemented in the configuration of the FPGA, which may be one of the 16 hardware objects included). |
| 6 | HWOA | Indicates Hardware Object Access when set, Memory access when clear. |
| 5-4 | - | Unused and will return a 0 when read. |
| 3-0 | PAGE | Indicates the page number of memory or the hardware object number to access. |

FIG. 3I

| BIT #: | NAME: | DESCRIPTION: |
|---|---|---|
| 7-5 | Not Used | These bits are not used and return a 0 when read. |
| 4 | CFVE | Configuration File Vendor Enable bit. This bit indicates that a successful check to enable the configuration file operation as defined by the files vendor has taken place. |
| 3 | FMWE | Flash Memory Write Enable bit. This bit indicates that a successful authorization to enable flash writing has taken place when set. |
| 2 | PWE | Password Enable bit. This bit indicates that a successful Password Check authorization has taken place when set. |
| 1 | MIDE | Machine Identification Enable bit. This bit indicates that a successful HDD ID authorization check has taken place when set. |
| 0 | QQPE | Quick Qard Product Enabled bit. This bit indicates that a successful product registration authorization code has taken place when set. |

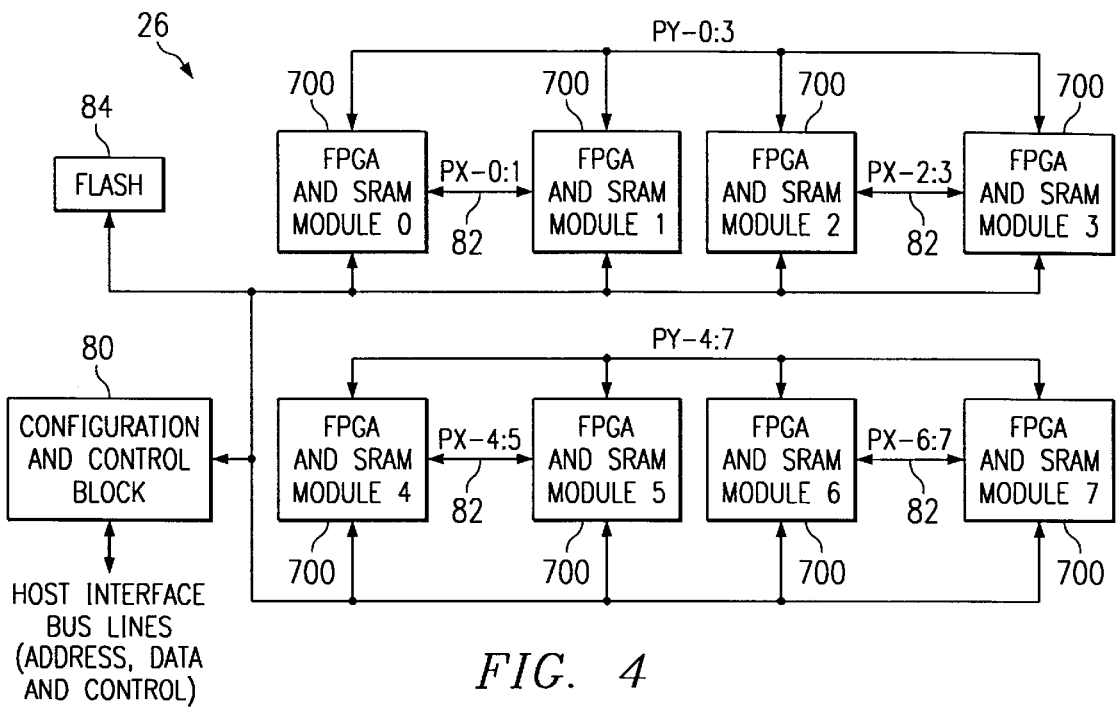

| RELATIVE QARD ADDRESS: | READ/WRITE TYPE: | DESCRIPTION: |
|---|---|---|
| $00000 | R/W | This memory address allows the divider count by value to be loaded and read back for verification. The divider is implemented by using a divide-by-1024 circuit that divides the crystal oscillator frequency by 1024. The resulting signal is then used to clock a counter that counts by the value programmed with this register. When an overflow in the counter occurs, it (1) generates an interrupt request from the hardware object and (2) increments a second counter by 1. When an interrupt is serviced the second counter value may be read to determine if any interrupts were missed since the last interrupt was serviced. |
| $00001 | R | A read at this relative address returns the 2nd counter output value which may be used to determine if any interrupts were missed since the last time the interrupt from the hardware object was serviced by the host. |

FIG. 6B

| HARDWARE OBJECT NUMBER: | ABSOLUTE CONFIGURATION ADDRESS: | SIZE OF HARDWARE OBJECT: | ASSIGNED INTERRUPT NUMBER: | DESCRIPTION: |
|---|---|---|---|---|
| 1 | $00000 | 2 | 1 | TIMER-1 |
| 2 | $00002 | 2 | 2 | TIMER-2 |
| 3 | $00004 | 2 | 3 | TIMER-3 |
| 4 | $00006 | 2 | 4 | TIMER-4 |
| 5 | $00008 | 2 | 5 | TIMER-5 |
| 6 | $0000A | 2 | 6 | TIMER-6 |
| 7 | $0000C | 2 | 7 | TIMER-7 |
| 8 | $0000E | 2 | 8 | TIMER-8 |

| SRAM ADDRESS: | USAGE: | DESCRIPTION: |
|---|---|---|
| $00000-$0000d | File | The filename of the configuration file active in the FPGA. Filenames are allocated 30 characters (SRAM is 16 bits wide). |
| $0000e | Mode | This 16 bit value indicates useful information to the driver about the configuration of the FPGA.<br>Bits 3-0: number of Hardware Objects present in the configuration.<br>Bits 14-4: future expansion.<br>Bit 15: indicates if the configuration is private. |
| $0000f | Active | The 16 bit value indicates which of the up to 16 hardware object are currently actively being used by an application software program. A value of 0 returned means all hardware objects are free and not being used. |
| $00010-$0001f | HWOI | Hardware Object Information words for each of the hardware objects beginning with hardware object 1.<br>Bits 3-0: The number of application programs using the hardware object currently.<br>Bits 14-4: future expansion.<br>Bit 15: indicates if sharing is enabled for the HW Object. |
| $00100-$001ff | OBJ #2 | 256x16 Allocated for use by hardware object #2. |
| $00200-$003ff | OBJ #4 | 512x16 Allocated for use by hardware object #4. |
| $01000-$01fff | OBJ #5 | 4096x16 Allocated for use by hardware object #5. |

| 130 | 132 |
|---|---|
| "file=Example.qqt" | ;Configuration File Name |
| "company=QUICKFLEX INC." | ;Company |
| "generator=Robert C. Ledzius" | ;Author or generator of the configuration file |
| "version=1.0" | ;Version |
| "driver=1.0" | ;Driver Version Required |
| "model=ALL" | ;Model of Quick Qard Required |
| "fpga=10k30-x" | ;Target FPGA (-x indicates any speed grade) |
| "clk0=20.0000MHz" | ;Frequency of CLK0 required (20MHz) |
| "clk1=NA" | ;Frequency of CLK1 required (none required) |
| "clk0e=true" | ;clk0 enabled |
| "clk1e=false" | ;clk1 not enabled |
| "flash=NA" | ;Page Number of Flash required (none required) |
| "sram=NA" | ;Amount of SRAM required (none required) |
| "cable=NA" | ;Cable required (none required, although could be used) |
| "expand=NA" | ;Expansion board needed (none required) |
| "private=TRUE" | ;Private configuration file, all objects have sharing off |
| "number=1" | ;Hardware object number 1 in the configuration file |
| "name=TIMER" | ;Hardware object name |
| "owner=QUICKFLEX INC." | ;The name of the company of the particular hardware object |
| "author=Robert C. Ledzius" | ;The author's name of the hardware object |
| "version=1.5" | ;The version of the hardware object |
| "compatible=1.0" | :The earliest compatible version of the hardware object |
| "offset=$00000" | ;The start address of the hardware object |
| "size=2" | ;The memory block size of the object |
| "irq=1" | ;The QQT interrupt number assigned to the hardware object |
| "sharing=FALSE" | ;Sharing allows multiple application access |
| o | o |
| o | o |
| o | o |
| "number=8" | ;Hardware object number 8 in the configuration file |
| "name=TIMER" | ;Hardware object name |
| "owner=QUICKFLEX INC." | ;The name of the company of the particular hardware object |
| "author=Robert C. Ledzius" | ;The author's name of the hardware object |
| "version=1.5" | ;The version of the hardware object |
| "compatible=1.0" | :The earliest compatible version of the hardware object |
| "offset=$00002" | ;The start address of the hardware object |
| "size=2" | ;The memory block size of the object |
| "irq=8" | ;The QQT interrupt number assigned to the hardware object |

126
134

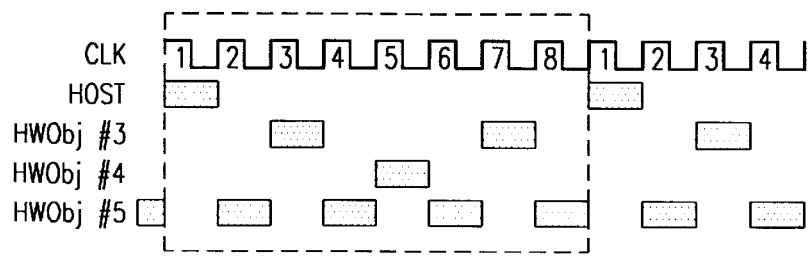

FIG. 8

RECONFIGURABLE COMPUTING SYSTEM AND METHOD AND APPARATUS EMPLOYING SAME

CROSS REFERENCES

QUICKFLEX INC. application Ser. No. 09/175,053, filed Oct. 19, 1998 (now abandoned), for Reconfigurable Secure Hardware Apparatus and Method of Operation.

TECHNICAL FIELD OF THE INVENTION

This invention relates generally to the field of computer hardware apparatus configuration and more specifically to a system and method of programming, reprogramming, and utilizing the hardware configuration of a reconfigurable computing board interfacing with a host computer.

BACKGROUND OF THE INVENTION

Typically hardware configurations for reconfigurable computing systems are designed for specific single applications to run one at a time with the reconfigurable computing system. Although an application's configuration may contain multiple hardware functions, the configuration is not usually designed for allowing different, unrelated applications to simultaneously share a single reconfigurable computing Field Programmable Gate Array ("FPGA") level resource. The ability for a single configuration file to contain multiple independent hardware objects that interface to multiple application programs running on a host system is increasingly important as reconfigurable computing technology migrates to mainstream computing environments.

Currently existing reconfigurable computing interface driver programs lack additional capabilities that are needed in today's multi-tasking environments.

These include the managing of multi-tasking and multi-use of reconfigurable computing objects, transparent relocation of hardware objects, and flexible hardware interrupts for multiple hardware objects in reconfigurable computing systems. It is also common that each individual application configuration often has a corresponding unique software driver for interfacing application software, instead of having a single driver that all software applications can utilize.

The use of relocatable objects in the software environment is commonplace and has helped significantly advance application software development. However, when a functional object is implemented in hardware, the possibilities of one hardware object conflicting with another hardware object's address space becomes a real possibility. An accepted way to address this today with any type of hardware board is the use of a controller circuit between the host processor (system) and the hardware board, which allows hard-wired addresses on the peripheral board to be offset by a value determined by the host processor. The host processor may then manage offsets of all such peripherals so that none conflict with any other. Further, when multiple hardware objects used by different applications are shared in a common configuration implemented through a reconfigurable computing system board, conflicts due to the use of a single allocated interrupt for the board can arise if the hardware objects use interrupt functions.

Additionally, current reconfigurable computing systems do not possess the capability to allow hardware objects to be partitioned and repartitioned into different FPGAs on the same board. The ability to have multiple FPGAs on the same reconfigurable computing board, which can then be used to implement multiple hardware objects contained in a single configuration file among the different FPGAs, makes it possible for an application to run multiple configuration files simultaneously or to load different configuration files to be used in sequence. Furthermore, such a partitionable reconfigurable computing board has the capability for multiple applications to each load a configuration file on a separate FPGA. Similarly, a single application can use multiple hardware objects contained within different reconfigurable boards or FPGAs within the same board in a system. Hardware objects partitioned into the same or different FPGAs on the same board can then be allocated intelligently as the need arises.

Different types of FPGA's used in a reconfigurable computing board require different implementations of a configuration file which may contain the same equivalent logic circuitry. Current reconfigurable computing systems do not have the capability for multiple configuration files targeted for different types of FPGA's, and providing the same or similar functionality, to be selected as necessary to properly interface a software application with the FPGA hardware type that is available in a system. The ability for an application program to be independent of the particular FPGA type used on a reconfigurable computing system board increases the flexibility associated with software and decreases the cost associated with software application development. The same is true for other board circuitry and for different hardware object versions.

Reconfigurable computing systems that can implement and perform highly algorithmic, repeated power-hungry tasks in hardware rather than in software can be especially useful in a portable computing environment. In a portable environment, both power and host system (processor) capabilities are at a premium, since a portable computing platform is by its nature limited in functionality by power requirements and physical size. A reconfigurable computing system that increases both the functionality and efficiency of a portable computer is therefore highly desirable.

In the personal computing environment additional functionality or interface capabilities can be provided by a Personal Computer Memory Card International Association ("PCMCIA") card. These computer cards meet the minimum compliance requirements of the PCMCIA standard (which is hereby incorporated by reference). PCMCIA cards are typically used to add functionality or memory to a personal, portable or desktop computer (i.e., a host computer), as described in the PCMCIA standards. Many types of PCMCIA cards are available, including input/output (I/O), PCMCIA cards that transfer data between a host computer system and an I/O bus, and data acquisition PCMCIA cards.

A typical PCMCIA card includes a standard PCMCIA connector connected to a PCMCIA interface circuit through a standard PCMCIA bus. The PCMCIA interface circuit operates according to the standard PCMCIA protocol to send data to and receive data from a host computer. The typical PCMCIA card also may include an interface circuit and controls the operation of the functional hardware on the card. For example, if the PCMCIA card is a memory card, then the functional hardware is memory (e.g., a bank of random access memory ("RAM"), chips, or a hard disk drive) and the PCMCIA card controller controls reading and writing to the memory.

PCMCIA card core functions can be implemented as hard-wired logic or as programmable logic (e.g., one or more FPGAs). The programmable architecture of FPGAs is provided through programmable logic blocks interconnected by a hierarchy of routing resources. The FPGA are customized by loading programming data into internal static memory cells. FPGA programming data are design-specific data that define the functional operation of the FPGAs' internal blocks and their interconnections. These programming data can be implemented and stored as configuration files by the application requesting the use of the FPGA.

Typically, when a PCMCIA card having the PCMCIA card controller and interface circuit implemented in an FPGA(s) is inserted into an operating (i.e., powered) host computer, or is inserted into a powered-down host computer that is then powered-up, the FPGA is programmed with programming data stored in non-volatile memory (e.g., EPROM, EEPROM, flash memory, etc.) on the PCMCIA card. Additionally, the FPGA can be programmed upon the initialization of a new application within the host computer. However, the memory required to store the FPGA programming data generally consumes a measurable area of the PCMCIA card which could be used to provide other functions within the PCMCIA card.

SUMMARY OF THE INVENTION

Therefore, there is a need for an improved reconfigurable computing system and method with the ability to allow a software driver for a reconfigurable computing platform to translate hardware object address offsets for the application software. As hardware object libraries continue to be developed, and as FPGAs continue to increase in circuit density, the necessity to combine multiple hardware objects within a common configuration file without requiring a previously released application software to be recompiled becomes a valuable capability.

There is also a need for an improved reconfigurable computing system and method with the ability to communicate information concerning hardware objects implemented in a configuration file to the reconfigurable computing software driver.

Additionally, there is a need for a reconfigurable computing system and method having a reconfigurable computing software driver with the ability to support multiple interrupts through a single host machine's interrupt line from a reconfigurable computing platform through the use of an interrupt flag and enable registers.

Similarly, a need exists for a reconfigurable computing software driver with the ability to call an interrupt event service routine provided by a software application when a corresponding interrupt is detected.

Moreover, there is a need for a partitionable reconfigurable computing system with the ability to allow hardware objects to be partitioned into the same or different FPGAs on the same board and allocated intelligently as the need for the hardware objects arises. There is also a need for a reconfigurable computing system that allows for multiple configuration files providing the same or similar functionality that are each targeted and configured to properly interface with different types of FPGAs (i.e., difference in either gate capacity, size, vendor, etc.)

Yet another need exists for a reconfigurable computing system having a software driver with the ability to manage the allocation of reconfigurable computing resources, hardware object usage, and sharing for application software programs. Additionally, a software driver is needed with the ability to pass unique location "handles" for hardware objects to software applications, and with the ability to determine from the reconfigurable computing card's resource information (which can be stored on or off the card) whether or not a given reconfigurable computing card meets the requirements of an application requesting services.

A further need exists for a reconfigurable computing system and method that allows a single configuration file to contain multiple hardware objects that may be used by many different dependent or independent software applications and that allows for a single hardware object to be shared by multiple software applications, or for a software application to utilize multiple hardware objects located on different reconfigurable computing boards in a system.

There is also a need for a reconfigurable computing system and method with the ability to allow a reconfigurable platform board to gain a boost in available power supply current through a peripheral power supply when the host machine is unable to supply enough power for a required application. Likewise, the need exists for a reconfigurable computing system and method with the ability for an external peripheral to supply a voltage supply of varying voltages for specifying what the interface voltage of I/O signals to an interface card should be.

Additionally, a need exists for a reconfigurable computing system and method having the capability to store FPGA programming data in configuration files within the host system memory.

In accordance with the present invention, a reconfigurable computing system and method are provided that substantially eliminate or reduce disadvantages and problems associated with previously developed reconfigurable computing systems and methods.

More specifically, the present invention provides a reconfigurable computing system and method for interfacing a plurality of application programs running on a host system to one or more hardware objects defined in one or more configuration files. The system includes reconfigurable computing circuitry comprising flexibly configurable circuitry operable for interfacing and implementing one or more hardware objects with one or more of the application programs. The system further includes memory circuitry associated with the reconfigurable computing circuitry for system information storage, and communications interfaces for connecting the reconfigurable computing circuitry and the memory to the host computer.

The flexibly configurable circuitry further comprises one or more FPGAs, one or more programmable logic devices ("PLDs"), SRAM and EEPROM memory, and all the necessary connectors and support circuitry. Alternatively, Application Specific Integrated Circuits ("ASICs") can be used in place of PLDs. The reconfigurable computing system and method of the present invention can be implemented on either a PCMCIA platform, a PCI platform, or any other bus structure without changing the basic functionality and claimed functionality of the reconfigurable computing system. Additionally, the reconfigurable computing system and method of this invention is suited to be implemented in and benefit a portable computing environment.

Additional embodiments of the reconfigurable computing system and method of the present invention provide a method and system to allow hardware objects to be partitioned into different FPGAs on the same board and allocated intelligently as the need for the objects arises. The method and system of this invention are independent of the type of FPGA used and allow for multiple configuration files that can provide the same or similar functionality and are each targeted to configure differing types of FPGAs. The reconfigurable computing software driver of the reconfigurable computing system and method of this invention has the ability to pick out the appropriate configuration file for a requested hardware object for the hardware type that is available in the system.

A further embodiment of the present invention provides a reconfigurable computing system and method with the ability to manage the allocation of reconfigurable computing resources, hardware object usage and sharing for application software programs. In this method and system a single configuration file may contain multiple hardware objects that can be used by different dependent or independent software applications. Also, a single hardware object can be shared by multiple software applications. Further, a software application can utilize multiple hardware objects located on different reconfigurable computing boards in a system. The method further provides for the storage of a reconfigurable computer card's resource information on or off the card such that the reconfigurable computing method may determine if a particular card meets the requirements of an application requesting services.

Still further embodiments of the apparatus, method and system of this invention provide for communicating hardware object information stored in a header located within the configuration file to application programs, for independent relocatable hardware object interrupts, for interrupt handling application message buffer passing (the ability for a software application to provide an interrupt event service routine that the reconfigurable computing software driver may call when an interrupt is detected), and for supplying voltage to the reconfigurable computing system through an external power supply.

Accordingly, it is an object of this invention to substantially improve the operability of reconfigurable computing platforms. A technical advantage of the improved reconfigurable computing system and method of this invention is the ability to allow a software driver for a reconfigurable computing platform to translate hardware object address offsets for the application software. As hardware object libraries continue to be developed, and as FPGAs continue to increase in circuit density, the necessity to combine multiple hardware objects within a common configuration file without requiring a previously released application software to be recompiled becomes a valuable capability.

A further technical advantage of the improved reconfigurable computing system and method of this invention is the ability to communicate information concerning hardware objects implemented in a single configuration file to the reconfigurable computing software driver.

Another technical advantage of this invention is the ability to support multiple hardware object interrupts from a reconfigurable computing platform on a host machine's single interrupt line through the use of an interrupt flag and enable registers.

Similarly, a technical advantage of the present invention is having a reconfigurable computing software driver with the ability to call a correct interrupt event service routine provided by a software application when an interrupt is detected.

A still further technical advantage of the improved reconfigurable computing system and method of this invention is the ability to allow hardware objects to be partitioned into different FPGAs on the same board and allocated intelligently as the need for the objects arises.

Another technical advantage of this invention is the ability to provide multiple configuration files that supply the same or similar functionality and that are each targeted and configured to properly interface with different types of FPGAs.

Yet another technical advantage of the improved reconfigurable computing system and method of this invention is a reconfigurable computing system software driver that can manage the allocation of reconfigurable computing resources, hardware object usage, and sharing for application software programs. Additionally, the software driver can pass handles of hardware objects to software applications, and can determine from the reconfigurable computing card's resource information whether or not a given reconfigurable computing card meets the requirements of an application requesting services.

A further technical advantage of this invention is the capability of a single configuration file to contain multiple hardware objects that may be used by many different dependent or independent software applications, and the ability for a single hardware object to be shared by multiple software applications. Similarly, a software application can utilize multiple hardware objects located on different reconfigurable computing boards in a system.

A still further technical advantage of the improved reconfigurable computing system and method of this invention is the capability of boosting the available power supply current to a card through a peripherals power supply when the host machine is unable to supply enough power for a required application. Likewise, another technical advantage of this invention is the ability for an external peripheral to supply a voltage supply of varying voltages for specifying the interface voltage of I/O signals to an interface card.

Another technical advantage of this invention is the easy adaptability of its technology to any bus type, such as a portable computing bus standard like PCMCIA.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIGS. 3A–3I illustrate the memory address location configurations and functions of the system configuration registers and miscellaneous control objects of the reconfigurable computing system of the present invention;

FIG. 4 is a simplified block diagram of an embodiment of the reconfigurable computing apparatus of this invention using multiple FPGAs;

FIGS. 6A, 6B and 6C show a sample configuration file as implemented in an embodiment of the reconfigurable computing system of the present invention;

FIG. 7 is a sample SRAM memory usage map for the reconfigurable computing system of the present invention;

FIG. 8 is a sample SRAM time-sharing multiplex usage graph; and

DETAILED DESCRIPTION OF THE INVENTION

Preferred embodiments of the present invention are illustrated in the Figures, like numerals being used to refer to like and corresponding parts of various drawings. However, it should be understood that various changes, substitutions, and alterations can be made hereto without departing from the spirit and scope of the invention.

The "Quick Qard" reconfigurable computing system, apparatus, and method of this invention allows for rapid product application development and market entry of products requiring custom or application-specific PC-card hardware. The technology allows for application software to define the hardware logic that it needs through software at the time it is executed. The Quick Qard technology system may be reconfigured on the fly to serve a multitude of purposes for product developers.

Applications that can benefit from the Quick Qard Technology ("QQT") system include standard or custom interfaces through real-time software applications that make use of the reconfigurable hardware for acceleration, allowing the software to implement features that would otherwise be difficult or impossible to implement. The system includes the Quick Qard driver software which aids in the ability to rapidly develop applications. The system allows the use of multiple relocatable hardware objects and multiple interrupts from a single PC-card socket configuration.

Development of hardware configurations for the Quick Qard technology system can be accomplished through the use of Altera FPGA MAX+plusII hardware development tools and I/O templates provided by QUICKFLEX INC. of Round Rock, Tex. By making use of existing libraries of mega-core functions, fully functioning hardware can be generated and working for an application in a day to one week's time, without concern for hardware manufacturing issues.

The present invention can be implemented using detachable cards that are operable to be used on various computing devices. For example, a detachable card could be used on a personal computer through a PCMCIA slot. The following description refers to detachable cards used for personal computers (hereafter called "PC-cards"), but the present invention can be applied to other types of computing devices, as well.

The Quick Qard Technology of the present invention is comprised of a family of several PC-card products that allow different software applications to define the hardware within the PC-card specific for each application at the time that it is executed. These reconfigurable computing ("RC") PC-cards ("Quick Qards" or "Qards") of this invention can be used for a variety of standard or custom interfaces, as well as for hardware accelerating software applications. Other applications that can benefit from the Quick Qard technology system include personal digital system interfaces, PC interfaces, industrial, emulation, video, audio, encryption, computer games, etc.

Figure 1:
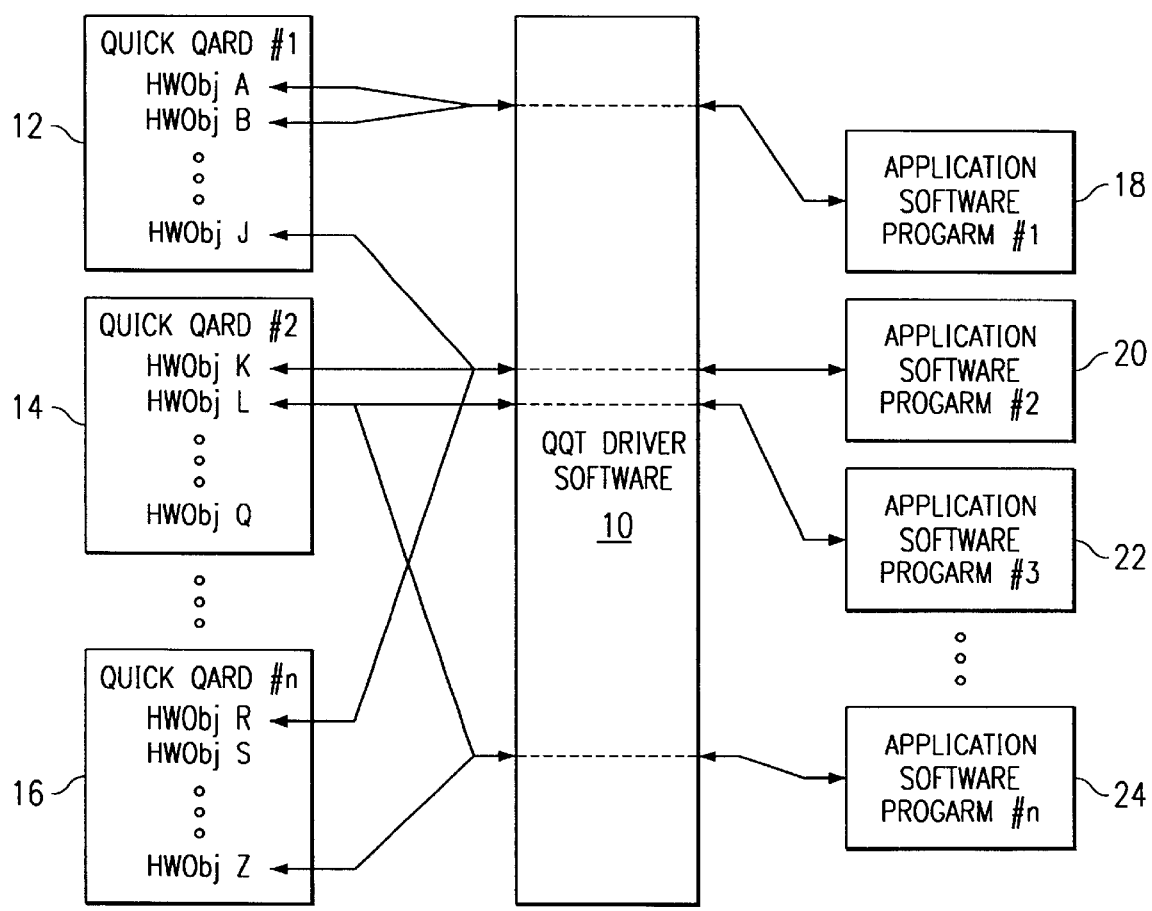
FIG. 1 is a conceptual drawing illustrating the interface operation of the Quick Qard Technology software driver.

Application software running on a host computer interfaces to the Quick Qard technology software driver for setting up hardware configurations in the Quick Qard system of the present invention and for accessing the hardware objects used by the application software. FIG. 1 is a conceptual drawing illustrating the interface operation of the Quick Qard technology driver software. Quick Card Technology software driver 10 acts as the interface between #1 Quick Qard 12, #2 Quick Qard 14 and so on up to #n Quick Qard 16 on one side, and #1 application software program 18, #2 application software program 20, #3 application software program 22 and so on up to #n application software program 24, on the other side. Any number of Quick Qards can be present in the reconfigurable computing system of the present invention within the physical power limits of the host processor. The same is true for the number of application software programs that can be run at one time.

QQT software driver 10 of FIG. 1 allows for flexible and expandable reconfigurable computing in a multi-tasking environment. QQT software driver 10 provides a resource management role if one application program is spawned and requires a certain hardware object. The application program may request from QQT software driver 10 the hardware objects it needs by name. QQT software driver 10 can allocate and initialize the hardware objects as requested and return handles for the hardware objects to the application program when the requested hardware objects are ready for use. If a configuration file contains additional hardware objects, QQT software driver 10 keeps track of which additional hardware objects are available in a given configuration file already in use. If a second application is spawned QQT software driver 10 allows it to access hardware objects located in a configuration file that is in use if those hardware objects are not themselves in use. By storing the necessary hardware object information in memory on the reconfigurable hardware resource, resource usage, among multiple tasks can be coordinated.

For instance, if #1 application software program 18 of FIG. 1 is spawned and requires hardware objects A and B located on #1 Quick Qard 12, QQT software driver 10 determines whether #1 Quick Qard 12 is in the system and not in use. If so, QQT software driver 10 configures the FPGA of #1 Quick Qard 12 with the configuration file information containing hardware objects A and B and sets the internal registers for the hardware objects A and B to indicate they are in use by #1 application software program 18. When hardware objects A and B are no longer needed by #1 application software program 18, they can be released by #1 application software program 18 for use by another application program. If the configuration file used by #1 application software program 18 to request hardware objects A and B also contains additional hardware objects not used by #1 application software program 18, they are available for use by other application programs.

If #2 application software program 20 is subsequently spawned and requests hardware objects J, K, and R, QQT software driver 10 determines if they are available. QQT software driver 10 knows of hardware object J located in #1 Quick Qard 12 and assigns it to #2 application software program 20. QQT software driver 10 also finds two other configuration files containing hardware objects K and R, but not a common configuration file containing both hardware objects K and R. QQT software driver 10 requests from the #2 application software program 20 that it needs two additional Quick Qards plugged into the host system to run the application. A user must insert the needed Quick Qards and QQT software driver 10 configures the new Qards with the appropriate configuration files, which may also contain additional hardware objects not currently used by any other application program.

3 application software program 22 is subsequently spawned and requests hardware object L, which in this example is a shared hardware object allowing other applications to simultaneously use it. QQT software driver 10 assigns hardware object L located on #2 Quick Qard 14 to #3 application software program 22 by sending an appropriate "handle" to #3 application software program 22 and initializes a sharing control register to indicate shared use of hardware object L by one or more application programs. Similarly, #n application software program 24 may share the use of hardware object L and obtain control of hardware object Z located in #n Quick Qard 16.

Application programs do not need to know the address where a hardware object is located at the time it is written because QQT software driver 10 provides a "handle" to the hardware object at the time the hardware object is requested and set up by examining header information contained with the configuration file and the virtual address of the RC resource. A "handle" serves as a unique identifier corresponding to the hardware address on the Quick Qard where the hardware object is located. Software applications can therefore be used with a variety of configuration files and a variety of hardware objects. QQT software driver 10 can also act as a librarian for hardware objects. If application software does not explicitly specify the name of the configuration file containing a requested hardware object, but instead indicates only the name and version of the hardware object, QQT software driver 10 can find the requested hardware object by examining the header information contained in the configuration files, which can be implemented prior to a request from a software application by compiling a hardware object header information table to increase the speed of the librarian functionality of QQT software driver 10. The hardware object header information table can contain information on each of the available hardware objects and configuration files. It can then serve as a cross-reference for QQT software driver 10 to match the available hardware objects and configuration files with one another and with an available and compatible Quick Qard.

Figure 2:
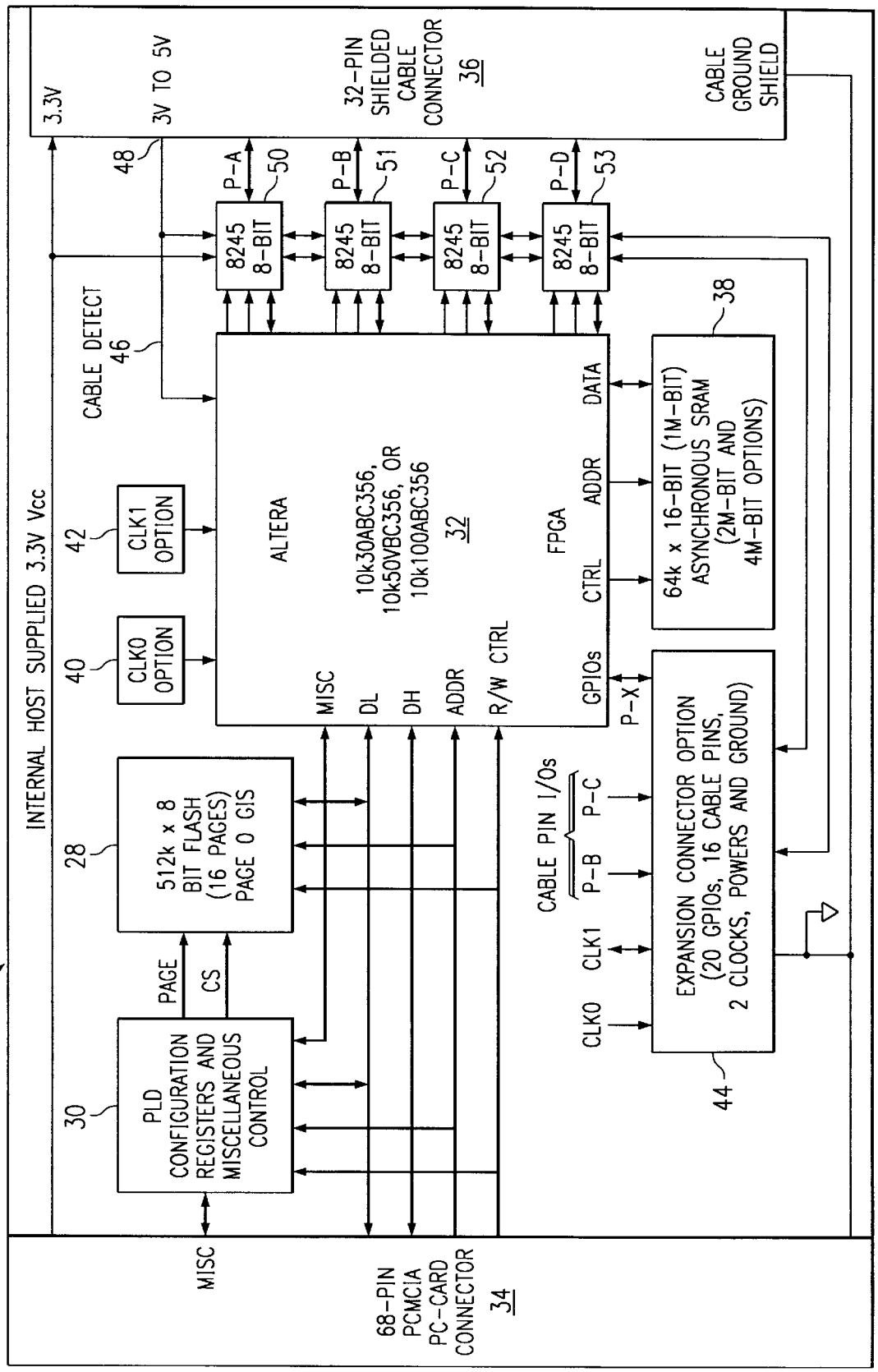
FIG. 2 is a functional block diagram of the reconfigurable computing hardware of the present invention.

FIG. 2 provides a functional block diagram of a portable embodiment of the reconfigurable computing hardware apparatus Quick Qard 26 of the present invention. Quick Qard 26 is the physical apparatus that makes possible the reconfigurable computing operations of the method and system of the present invention. Variations of the implementation and features of the design of Quick Qard 26 may change without losing the spirit and scope of the invention described and which provide a solution to the challenges and problems described herein. The solution illustrated by Quick Qard 26 is not based only upon the hardware shown in FIG. 2, but is also dependent upon features designed into the supporting QQT software driver 10 for the presented hardware.

The embodiment of Quick Qard 26 shown in FIG. 2 demonstrates interfacing a PCMCIA PC-card socket to a host bus using 68 pin bus connector 34. Bus connector 34 is defined by the PCMCIA standard which is well documented and understood. This interface to the host bus requires a socket controller, which typically resides on the host motherboard, or a host socket controller board which contains a socket to plug a PC-card into. The socket controller allows for software defined address offset and windowing for each of the PC cards controlled by the controller. This feature of the external controller allows for resolution of address conflicts of different PC-cards, but it does not allow for relocation of each individual hardware object that might be simultaneously implemented in a single configuration file loaded into a single reconfigurable computing board or device. As more fully discussed below, one embodiment of the method and system of this invention makes possible the use of multiple hardware objects in a single Quick Qard 26 implementation through a single hardware interrupt without the resulting address conflicts between different hardware objects. Consequently, relocation of individual hardware objects that might be simultaneously implemented in a single configuration file is made possible.

The socket controller, or similar controller (such as a PCI bus controller) can be implemented directly onto the reconfigurable computing board and made to sit onto a different type of bus structure without changing the basic functionality of the reconfigurable computing system. The reconfigurable computing system apparatus and method of this invention are therefore not confined to the PCMCIA standard or any other given bus standard.

Programmable logic device ("PLD") 30 of FIG. 2 implements the configuration registers and miscellaneous control logic for Quick Qard 26. However, the configuration registers and miscellaneous control objects could just as well be implemented into an ASIC device or merge with the socket controller part when interfaced with a different type of bus structure.

As will be more fully described below in the description of FIG. 6, some of the configuration registers shown in FIG. 6 are defined and required by the PCMCIA standard for implementation of a PC-card (addresses $10000 through $$1007E). Implementation using other bus structures may require similar or additional registers to comply with defined bus standards, which would be well documented and understood. The registers shown at addresses $10080 through $100FE are for Quick Qard specific functionality. The actual addresses of the registers and the way the programmable bits are packed can change without affecting the spirit and scope of this invention.

Field programmable gate array ("FPGA") 32 can be configured with hardware logic after Quick Qard 26 is configured by QQT software driver 10 when requested by application software as previously described. FPGA 32 can be reconfigured in real-time to accomplish different hardware based tasks as the needs of an application change, or as different applications are spawned. Although the description of this invention refers primarily to an FPGA, it is to be understood that the scope of the reconfigurable computing system of this invention encompasses the use of any SRAM configurable programmable logic device, and in particular the use of an FPGA.

Some applications may require more power to FPGA 32 than is budgeted by the PCMCIA interface. If an application interfaces through Quick Qard 26 to an external peripheral device, the power to Quick Qard 26 can be boosted by providing additional current through external cable power supply pin 48 connected through external cable interface 36. The increase in power available to Quick Qard 26 allows the software application to perform more power intensive tasks. Although this implementation of the reconfigurable computing apparatus of the present invention shows a single type of FPGA (specifically Altera Models 10k30ABC356, 10k50VBC356, and 10k100ABC356), the present invention can be implemented with different types and multiple numbers of FPGAs using additional control signals to enable each individual FPGA from a configuration register.

As shown in this embodiment, external cable interface 36 is a 32 pin cable connector with a grounded shield pin used for ground between Quick Qard 26 and the external system being interfaced to. Power supply pin 48 is reserved for Quick Qard 26 supply voltage, which may be used in a variety of manners. One way is as an output for powering a low power peripheral device, provided the power budget from the host is sufficient to support the external device. Another way is to loop back the voltage supply through power supply pin 48 for powering input/output transceivers 50, 51, 52 and 53 and for providing a cable detect signal 46. As described above, power supply pin 48 also allows for an externally powered peripheral device to "boost" the available power to Quick Qard 26 for an application requiring more power to Quick Qard 26 than can be supplied by the host machine alone.

Transceivers 50, 51, 52 and 53 allow for driving a high capacitive load at a voltage defined either by the internal voltage of Quick Qard 26 or for level shifting I/O signals at a voltage to be defined by the external peripheral. 8-bit input/output transceivers 50, 51 and 52 and 6-bit input/output transceiver 53 (each of which may be configured as an output or input port) make up the remaining thirty cable pins of external cable interface 36.

Also shown in FIG. 2 is an optional expansion connector 44, which in this embodiment is a low profile connector fitting into a type II PCMCIA card slot. In a PCMCIA embodiment of the reconfigurable computing system of this invention, expansion connector 44 can be a "Piggyback" connector and may be either covered with Quick Qard 26's lid if not used, or may accept a piggyback board (not shown) to expand functionality, turning Quick Qard 26 into a type III PCMCIA card (a double height card). Expansion connector 44 can contain FPGA general purpose I/Os for expanding functionality to another FPGA 32 located on the piggyback board, or additional circuitry that may be required by a specific application. Also, expansion connector 44 can contain connections directly to the pins of external cable interface 36 for handling analog signals that can be supplied from either a piggyback digital to analog converter (DAC) or analog to digital converter (ADC). Clocks 40 and 42 also can have pins that are connected to expansion connector 44 to allow clocking of circuitry, or to allow for a piggyback board to supply a clock signal to FPGA 32. Such a clock signal can be supplied from a phase locked loop (PLL). Expansion connector 44 can be implemented in any embodiment of the reconfigurable computing system of the present invention.

Clocks 40 and 42 can be used to provide clock signals of different frequencies. Clock 42 is an optional clock signal that can be supplied by a phased lock loop on a piggyback board, or that can supply a random signal from a noise generator type circuit for random data generation in applications requiring robust randomness. Examples of such applications are key encryption applications, for example, those disclosed in the associated patent application Ser. No. 09/175,053, filed Oct. 19, 1998, for Reconfigurable Secure Hardware Apparatus and Method of Operation. The oscillators of each of clocks 40 and 42 can be disabled or enabled from a configuration register within PLD 28.

SRAM 38 of FIG. 2 can be either an 8-bit or a 16-bit wide SRAM. This is because it contains a low and high bit enable signal in addition to the chip select for the memory. SRAM 38 can be static to allow Quick Qard 26 to be disabled and held in a low power state. The FPGA 32 configuration may use SRAM 38 in any way, such as partitioning it for use by multiple hardware objects. Bus size and the number of SRAMs 38 with their own dedicated bus to FPGA 32 may vary without changing the spirit of the present invention.

As discussed more fully below, each configuration file that a given application may invoke to program FPGA 32 contains information about each of the individual hardware objects implemented by that configuration file in a header that QQT software driver 10 can access. For "shared" type configuration files, which will be indicated in the QQT configuration option register (as discussed more fully below as part of FIG. 3B) once configured into Quick Qard 26, the header information is transferred into SRAM 38 beginning at address zero. This header information is made accessible via a hardware object in FPGA 32. This feature provides an activated Quick Qard 26 the capability to allow applications other than the application that spawned the active configuration to share information concerning what hardware objects are available in Quick Qard 26. This allows multiple instances of QQT software driver 10 to share the use of a common Quick Qard 26 with different active unrelated software applications.

A Quick Qard configuration file contains the raw data to program FPGA 32 to perform a particular hardware function or functions. Each configuration file for FPGA 32 may contain multiple hardware objects which may operate independently of each of the others. Information about each hardware object in a single configuration file can be put into a header within the configuration file along with the raw FPGA program data. The header information allows QQT software driver 10 the ability to attach handles to each of the hardware objects at the time the configuration takes place, and to use these handles to allow applications to interface to each of the hardware objects. QQT software driver 10 also acts to serialize application software access to reconfigurable computing resources (such as multiple Quick Qards 26) to prevent resource usage conflict. The following tables illustrate the parameters of each hardware object contained in a configuration file (Table 1) and additional information contained in the header about the configuration file itself (Table 2). A sample configuration file and description are also included in the description of FIG. 6.

TABLE 1

| Hardware Object Parameter: | Parameter Description: |
| --- | --- |
| Number | A number of the hardware object within the file. The first hardware object is number 1, and hardware objects are numbered sequentially within the header. |
| Name | The name of the hardware object. |
| Author | Company and name of the author of the hardware object. |
| Version | The version of the hardware object. Version refers to the functionality of the hardware object and not the address offset of the hardware object. |
| Compatible Version | The version number of the earliest compatible version of the present hardware object. The hardware object implemented will be compatible with all versions of numbers between this number and the indicated version. |
| Offset | The address offset from zero where addressing of the hardware object begins. |
| Size | The address block size of the hardware object. |
| Interrupt | Zero indicates that no interrupt is generated from this hardware object. Interrupt number 1–8 may be assigned to a hardware object. |
| Sharing | True allows multiple applications to use the object at the same time. False indicates only one application may use the object at a time, which must be checked in and out through the driver. If any of the hardware objects within a configuration file have this parameter enabled, the first hardware object #1 must be a special hardware object that allows the driver to use a portion of the on Qard SRAM for access management. |

TABLE 2

| Configuration File Parameter: | Parameter Description: |
| --- | --- |
| Author | Company and name of the author of the configuration file. |
| Version | The version of the configuration file. |
| Driver | The version of the driver required. |
| Qard | The version of the Quick Qard configuration PLD required. |
| FPGA | The FPGA type and minimum speed grade required. |
| CLK0 | Frequency required by CLK0. Zero if no particular frequency is required. |
| CLK1 | Frequency required by CLK1. Zero if no particular frequency is required. |
| CLK0E | Indicates if CLK0 is enabled. |
| CLK1E | Indicates if CLK1 is enabled. |
| Flash | Page number of flash required. |
| SRAM | Amount of SRAM required. |
| Cable | External cable configuration required. |
| Expand | Piggyback expansion board required (indicates type of board needed). |

Returning to FIG. 2, Quick Qard 26 memory modules EEPROM 28 and SRAM 38 define space for the card information structure (CIS), PCMCIA configuration registers, Quick Qard 26 system registers, and configuration hardware object I/O space. In particular, SRAM 38 can be used for hardware object usage and resource management and EEPROM 28 can be used for CIS and other non-volatile memory storage for the system, or for hardware object usage. All the configuration option registers for the PCMCIA standard are not implemented, but all are defined in the memory map to allow for future expansion. Expansion space is also defined to allow for changing implementation in the future.

The PC-card CIS attribute memory is located in the first 64K of attribute memory space. Since only even address locations are used for attribute CIS data in this embodiment of the present invention, the storage space can actually be only 32K by 8K in size. On power up or hardware reset, PLD 30 defaults to page 0 or flash EEPROM memory for memory access. Regardless of how what page of memory is indicated by QQT memory register $10084, when an attribute memory access is made the access will be to CIS page 0 for the first 64K of space since the page control only affects common memory accesses. This means that the CIS is also accessible via common memory address space for information about the particular Quick Qard 26, such as PLD 30 version, FPGA 32 type and speed, clocks 40 and 42 frequencies, flash size, SRAM 38 size and speed, external I/O configuration and expansion connector 36 configuration. The combinations of these features and future features may change from one Quick Qard 26 to another and this space is used to indicate to QQT software driver 10 specific information about the Quick Qard 26 being used.

FIGS. 3A through 3I illustrate the memory address location configurations and functions of the system configuration registers and miscellaneous control objects of Quick Qard 26. FIG. 3A is a memory map of the memory address, locations corresponding to the different registers implemented in the Quick Qard technology system 26 of the present invention. Column 54 lists the address location of each of the separate registers. Columns 56 and 58 indicate the division of memory space between attribute memory and common memory for each of the registers. Row 60 of FIG. 3A subdivides the memory locations of the various QQT specific registers, and Row 62 subdivides the memory locations defined by the PCMCIA standard. Row 64 constitutes the memory locations which contain the CIS, hardware object access or information about the particular Quick Qard 26 being used.

FIG. 3B shows the implementation of the configuration option register, located at memory location $10000. All bits of the configuration option register (which is defined by PCMCIA standard) are implemented in the reconfigurable computing apparatus system and method of this invention and are used in this embodiment of Quick Qard 26 as shown in FIG. 3B. Column 66 lists the bit number of a particular function. Column 68 provides the name of the function corresponding to a particular bit number, and Column 70 describes the function performed at the corresponding bit number in Column 66.

In FIG. 3C, the implementation of the configuration and status register, which in this case is contained in memory location $10002, is shown. The configuration and status register (again defined by PCMCIA standard) is implemented, but not fully functional, in Quick Qard 26 of the present invention. Like in FIG. 3B, Columns 166, 168 and 170 indicate the bit number, the name of the function and the description of the function determined by a corresponding bit number, respectively.

FIG. 3D shows the pin replacement register located at memory address $10004. The pin replacement register is defined by the PCMCIA standard and is implemented but not fully functional within this embodiment of the apparatus of this invention. Since there is no on-card battery and no write-protect switch on Quick Qard 26 in this embodiment, the only functions implemented in the pin replacement register are the ready and changed ready indicator bits, as shown. Incorporation of these and other functions shown in FIG. 3D can be implemented in a future version. Columns 266, 268 and 270 indicate the bit number, the name of the function corresponding to that bit number, and a description of that function, respectively.

FIG. 3E illustrates the implementation of the extended status register of this invention located at memory location $10008. The extended status register is defined by the PCMCIA standard and is fully implemented in this embodiment of Quick Qard 26 of the present invention. The extended status register allows for up to four additional events to generate a set CHNG bit-7 in the Card Configuration and Status Register (at memory location $10000). Event zero (bit 0) in FIG. 3 may be used for detecting when a cable is attached or detached. Events 1 through 3 are reserved for user-defined events from FPGA 32. Columns 366, 368 and 370 indicate the event bit number, the name of the event, and a description of the event implemented by the corresponding bit number, respectively.

FIG. 3F illustrates the QQT configure control register at memory location $10080. This register is used for FPGA 32 configuration control of the reconfigurable computing system of this invention. Columns 466, 468 and 470 indicate the event bit number, the name of the event, and a description of the event implemented by the corresponding bit number, respectively.

FIG. 3G shows the configuration of the QQT memory register located at memory location $10084. This register defines the memory page access for the first 64K of access of the common memory. Columns 566, 568 and 570 indicate the event bit number, the name of the event, and a description of the event implemented by the corresponding bit number, respectively. Bit-7 of Column 566 indicates if the page number correlates to an EEPROM flash or SRAM access. Bits 5–0 indicate the page number (two bits are not used here, but are left for future page expansion). Flash page numbers may be between 0 and $F, where 0 is the CIS memory bank, but only even addresses are used. An odd address will operate as if the least significant address bit is cleared. SRAM page numbers available depend upon the amount of SRAM populated on Quick Qard 26 and the hardware objects that are implemented within the active configuration of FPGA 32 in Quick Qard 26.

FIGS. 3H and 3I illustrate the configuration of the QQT control register and the QQT security register located at memory addresses $10086 and $1008C, respectively. The QQT control register controls or monitors features within Quick Qard 26, as indicated in FIG. 3H, and the QQT security register implements security features built into the Quick Qard 26 reconfigurable computing system. These security features are described in detail in the security feature patent disclosure application Ser. No. 09/175,053, filed Oct. 19, 1998, for Reconfigurable Secure Hardware Apparatus and Method of Operation.

Additionally, there is a socket and copy register located at memory address $10006 that is not implemented in this embodiment of this invention, but the address for it is defined for future expansion of this feature. Also, a QQT Configure Data register located at memory address $10082 is used for writing configuration data to FPGA 32. PLD 30 does not actually store the data at this location, but does provide address decoding so that the FPGA 32 chip selects respond to this location when in configuration mode.

QQT Interrupt Enable register located at memory location $10088 is used to independently enable each of the eight function interrupt signals that may be captured in the function interrupt flag register $8A. When these bits are cleared, their corresponding interrupt flag will remain in its current state and new interrupts will not be captured. The QQT interrupt flag register located at memory location $1008A provides for up to eight interrupts being captured from hardware objects in FPGA 32. For any of these interrupts to be captured, the corresponding enable must be set in the QQT Interrupt Enable register. Each of the flags will remain set after an interrupt is captured until it is cleared by writing a 0 to the flag bit. Writing a "1" to any of the flag bits has no effect on the state of the register. Each of the flags is logically OR'ed and indicated collectively in the INTR bit of the Configuration and Status register at $10002.

FIG. 4 illustrates a simplified view of another embodiment of the reconfigurable computing apparatus of this invention using multiple FPGAs 32 on a single Quick Qard 26, for example, where Quick Qard 26 is a PCI-type embodiment. FPGA 32 and SRAM 38 of FIG. 2 are shown in FIG. 4 for this embodiment as a single combined FPGA and SRAM module 700. Configuration and control block 80 contains the configuration registers, oscillators and miscellaneous control objects to interface the host interface bus to the reconfigurable computing resources of Quick Qard 26. The data and address bus used by configuration and control block 80 to interconnect to each of the FPGAs 32 is designed to be pin-for-pin compatible with the single FPGA 32 implementation of Quick Qard 26 as shown in FIG. 2, thus enabling configuration files designed for one embodiment to be mapped into any one of the eight FPGAs 32 shown in the multi-FPGA embodiment of FIG. 4.

PX bus 82, used for an expansion connector 44 in the single FPGA embodiment, is shared among pairs of FPGAs 32 in this embodiment and can be used to interface configurations requiring two FPGAs 32 to be implemented with a dedicated common interface bus. The expansion connector for each of the PX buses 82 can still be incorporated and shared among a pair of FPGAs 32. These dual FPGAs 32 type configurations can be mapped into any four of the FPGA 32 pairs shown. Similarly, an interface bus connecting all FPGAs 32 in two dual configurations allows a configuration requiring four FPGAs 32 to share a common interconnect bus using the previously unused pins of the FPGA in the described PCMCIa embodiment. These quad-type implementations can be configured, for example, into either of the two shown quad sections of FIG. 4.

Port expansions may still be incorporated on any or all of the FPGA and SRAM modules 700. A PZ bus that interconnects all eight FPGA and SRAM modules 700 could be added, and octal sections repeated in a likewise manner, provided the FPGAs 32 of FPGA and SRAM modules 700 contain sufficient interconnects to allow the next level of bus expansions. Note that this possible PZ bus is not shown in FIG. 5. Additions to the configuration and control block 80 include an enable for each module shown and expanded interrupt and interrupt enable registers. This embodiment allows for flexible, expandable, and compatible usage of reconfigurable computing resources as the needs of the host machine change during an operating session or over longer periods of time. Flash module 84 is shown as a shared resource for the entire board, but each module could contain its own flash 84, as well.

Figure 5:
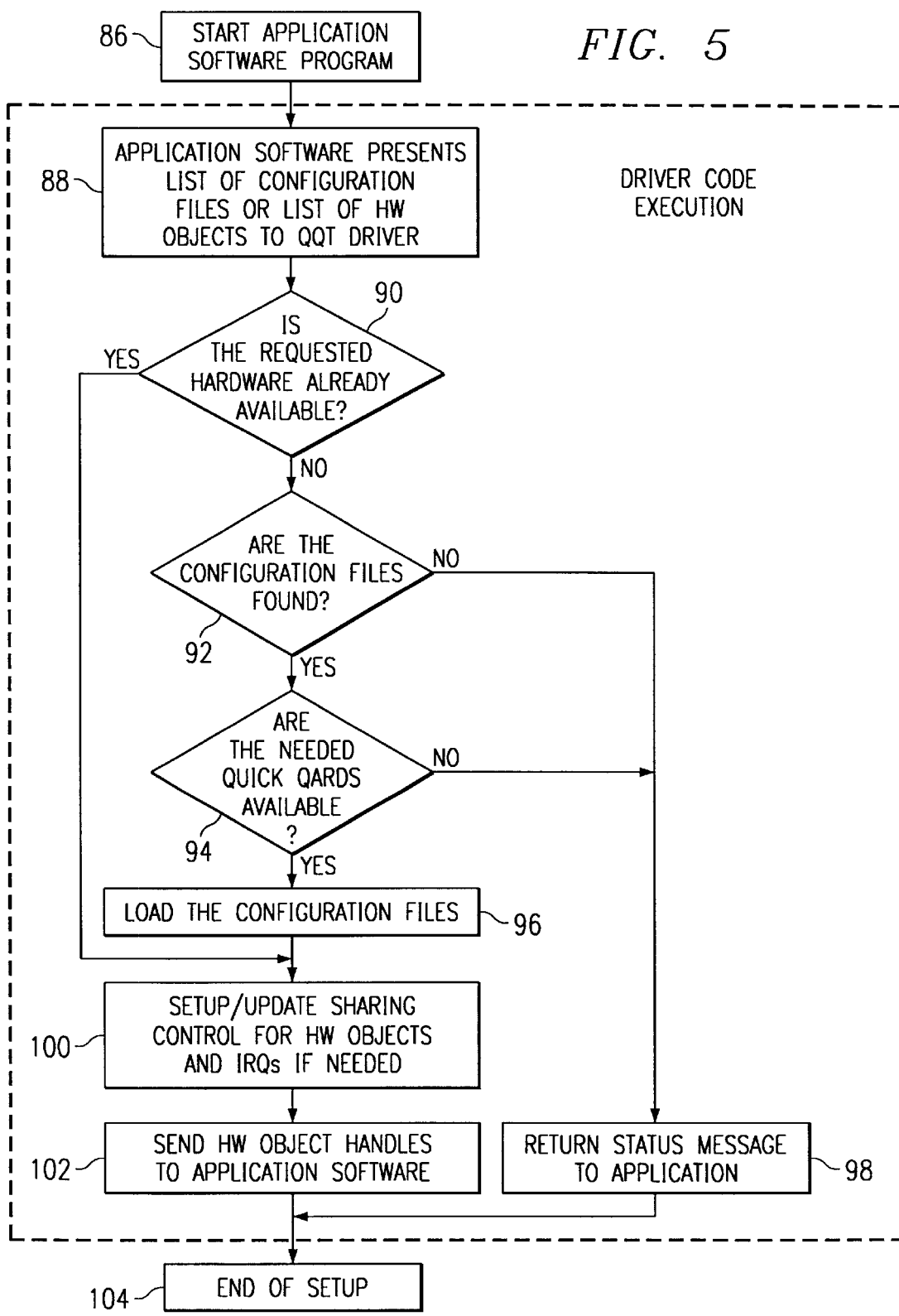
FIG. 5 is a flowchart showing one implementation of the Quick Qard Technology application software set-up procedure.

FIG. 5 is a flowchart of the Quick Qard technology application software set-up procedure showing one process that can be used to set up application software programs for use with Quick Qards 26 of FIGS. 2 and 4. At step 86 an application software program is started (spawned). At step 88, the application software program communicates with QQT software driver 10 and presents a list of hardware objects for the application to use. The application software program may also present the name of a configuration file or files that it recommends QQT software driver 10 use. At step 90, QQT software driver 10 checks if the requested configuration file(s) and hardware object(s) are already available for use in the system. If they are, at step 100 QQT software driver 10 uses them by setting up or up-dating the sharing control for each of the hardware objects and IRQs, if needed. At step 102, QQT software driver 10 returns a handle to the application program for each of the requested hardware objects. Set-up is complete at step 104.

If at step 90 the requested configuration file(s) and hardware object(s) are not available, then at step 92 QQT software driver 10 looks for configuration file(s) that contain the hardware object(s) that are not presently available in the system. If QQT software driver 10 is unable to locate the requested information (configuration file(s) and/or hardware object(s)), then at step 98 an error message is displayed indicating the problem and an error message is returned to the application program. If the requested configuration and hardware objects are found, at step 94 QQT software driver 10 determines if a Quick Qard 26 is plugged into the system and available for use.

If the required Quick Qard is available for use, the configuration file is downloaded into the available Quick Qard at step 96 and at step 100 sharing control for each of the hardware objects requested is initialized in the SRAM and IRQs are set. A list of hardware object handles is returned to the application software program at step 102, and set-up is complete at step 104. If no Quick Qard is available at step 94, a window asking the user to insert Quick Qard 26 is displayed at step 98. If the user cancels out the window, an error message is displayed and an error message is returned to the application software.

If the hardware requested is not available to an application, the application software program can still operate with functionally equivalent, but slower or reduced-feature software objects in place of the hardware objects. This allows the reconfigurable computing platform of the present invention to be treated as an "up-grade" for the application software, and does not require the software to have the reconfigurable computing hardware in place when the application is run, as with prior art systems. These functions are all carried out by way of QQT software driver 10.

Furthermore, if an application program requires QQT software driver 10 to use an interrupt service routine for a particular hardware object, it can specify to QQT software driver 10 the event subroutine or call code to be used so that QQT software driver 10 can call the appropriate application event subroutine when it detects an interrupt from a particular hardware object.

For illustrative purposes, the reconfigurable computing system and method of this invention has been described using separate Quick Qards 26, each using a single configuration file. However, the system and method of this invention can have a Quick Qard 26 with multiple FPGAs on a single Qard, as shown in FIG. 4, which can act in the same manner described for a single FPGA. When multiple FPGAs 32 are present on a single physical Qard, programmable interconnects can be used between the multiple FPGAs 32 to allow a larger hardware object to be implemented and partitioned onto the multiple FPGAs 32. This would require multiple configuration files for a single hardware object. These interconnects are more fully described above as part of FIG. 4.

When an application program is closed or exited, the hardware objects used for that application program can be released. If all of the hardware objects in a Quick Qard 26 are released, the Quick Qard 26 may be reset to be made ready for use by future application software programs. An application software program can also release one hardware object and request another hardware object as the requirements of the application change, allowing FPGA 32 to adapt to different functions as they are needed by the application program.

Depending on the operating system used to implement this invention, the embodiment may change. For instance, it may be required in some systems to have multiple instances of a single QQT software driver 10 for each application being run. Each instance of the QQT software driver 10 can be threaded to the others.

An additional benefit of the present invention is that it may handle reconfigurable computing boards that contain different types of FPGAs by the same vendor, or even different vendor FPGAs 32. Since an application software program may request hardware objects by name, QQT software driver 10 may find a configuration file that is built for a particular type of FPGA 32 that is used in the available reconfigurable computing board resource and contains the required hardware objects. Multiple configuration files can be supplied for different target types of FPGAs 32 that contain the same or similar functionality. The hardware object interface can remain the same regardless of the configuration file in which it is located.

FIGS. 6A, 6B and 6C show a sample configuration file as implemented in an embodiment of Quick Qard 26 of the present invention. FIGS. 6A, 6B and 6C demonstrate an example of a simple timer hardware object implementation where each of eight timers use a memory size of two memory locations. The sample configuration file illustrates the template for all I/O signals of FPGA 32 contained on Quick Qard 26, as well as eight simple timer hardware objects. Although the example shown does not use all of the features of Quick Qard 26, it is sufficient for discussing and demonstrating how hardware objects are built and used within the Quick Qard technology system of this invention.

FIG. 6A is a hardware object memory map for an individual timer hardware object of this example. Each hardware object can have more than one address as an interface. Column 110 shows each of the example timer hardware objects with two relative memory addresses for interfacing to the hardware object. Column 112 shows the type of memory location at a given address, i.e., read or read/write. Lastly, column 114 of FIG. 6A provides a description of the function implemented at the corresponding memory address of column 110.

QQT software driver 10 passes a handle to an application program for each hardware object requested, the application program can thereafter reference all I/Os to a hardware object from the reference address defined by the handle. Each hardware object can have multiple addresses to interface to, and the configuration file header information can include the starting address of the object within Quick Qard 26 and the size of the memory allocated to a particular hardware object. In the hardware timer object example shown, the size of memory allocated to each timer is two memory address locations.

FIG. 6B is a configuration file hardware object address mapping table. Since the example configuration file contains eight identical timer hardware objects, it maps each of the individual instances of the simple timer hardware object to a unique address. As shown in FIG. 6B, the addressing of each timer hardware object in this example is at least two memory locations apart to ensure the addresses from one hardware object do not conflict with the addresses of another hardware object. Column 116 shows the hardware object number for a given timer hardware object. Column 118 gives the corresponding absolute configuration address for that hardware object, and column 120 contains the memory size of the hardware object. Column 122 determines the assigned interrupt number for the corresponding hardware object number, and column 124 provides a description of the corresponding hardware object.

Addressing for each of the timer hardware objects of this example-can be arbitrarily placed at any non-conflicting memory address. It is possible that some hardware objects may have overlapping address space, such as when sharing is enabled for a configuration file which requires the incorporation of a hardware object that allows direct SRAM access by QQT software driver 10. QQT software driver 10 SRAM access is used to load the configuration file name configured into an FPGA 32 onto the reconfigurable computing board so that other instances of QQT software driver 10 or other application software programs can make a determination of the use of the reconfigurable computing resources.

The example configuration file shown in FIGS. 6A and 6B can have a corresponding header information block, as shown in FIG. 6C. There are multiple ways in which the information can be provided to QQT software driver 10 which do not vary from the scope of the present invention. For instance, the header can be a second header file included with the raw configuration data file, or it can be appended to the beginning of a raw configuration data file. Also, the parameters can be shown as defined in FIG. 6C, or, if the incorporation order of the information is fixed and defined, the information can be contained with NULL between the parameter strings. The information can be converted to a raw data format or can be defined in ASCII. The important and novel aspect of the information is that QQT software driver 10 is passed information about what is contained in the configuration file to intelligently manage the reconfigurable computing resources of Quick Qard 26 of the present invention.

The first section of the header shown in row 126 of FIG. 6C contains information about the top level configuration, and not about specific hardware objects. Column 130 at row 126 provides information such as the file name, the company generating the file, the originator of the file, QQT software driver 10 version, etc. Column 132 at row 126 provides a description for the corresponding information objects located in column 130 at row 126.

The second section of the header, at row 134, contains information about each of the hardware objects defined by the configuration file. Column 130 at row 134 provides the values for each of the given information objects and column 132 at row 134 provides a description of the corresponding information objects. As shown in FIG. 6C at row 134, similar information is provided for each of the eight simple timer hardware objects of this example.

FIG. 7 is a sample SRAM 38 memory usage map. The SRAM 38 present can be used in a variety of different manners, depending on the needs of each of the individual hardware objects. In the design of a configuration file, SRAM 38 can be shared between each of the hardware objects present that require some SRAM 38, as well as between the host accesses when a configuration file is not private. With the exception of private configuration files, the start of SRAM 38 is always used for reconfigurable system management of the reconfigurable computing resource.

In the SRAM sample memory usage map of FIG. 7, column 136 provides the SRAM address, column 138 provides the usage for the corresponding SRAM address, and column 140 provides a description of the usage for the corresponding SRAM address. Since SRAM 38 is shared by several hardware objects, memory usage should be managed by a memory management circuitry or by time division multiplexing. This can be done in many different acceptable ways, one of which is shown in the time usage allocation diagram of FIG. 8.

FIG. 8 shows a sample SRAM 38 time-sharing multiplex usage. A 20 MHz internal clock is shown divided into eight phases for SRAM 38 access usage. The first phase is reserved for host access of SRAM 38 for interrogation of the header information and object usage information for a hypothetical configuration. Assuming that hardware object #5 of the example shown in FIG. 8 requires higher amounts of SRAM bandwidth usage, all even phases of the clock are reserved for its use. The remaining hardware objects are also allocated some time slots for accessing SRAM 38. A simple state machine can be used to enable SRAM 38 usage for each of the hardware blocks. There are a variety of methods for interfacing hardware objects to their respective allocated locations which go beyond the scope of the description of this invention but are well known.

Figure 9:
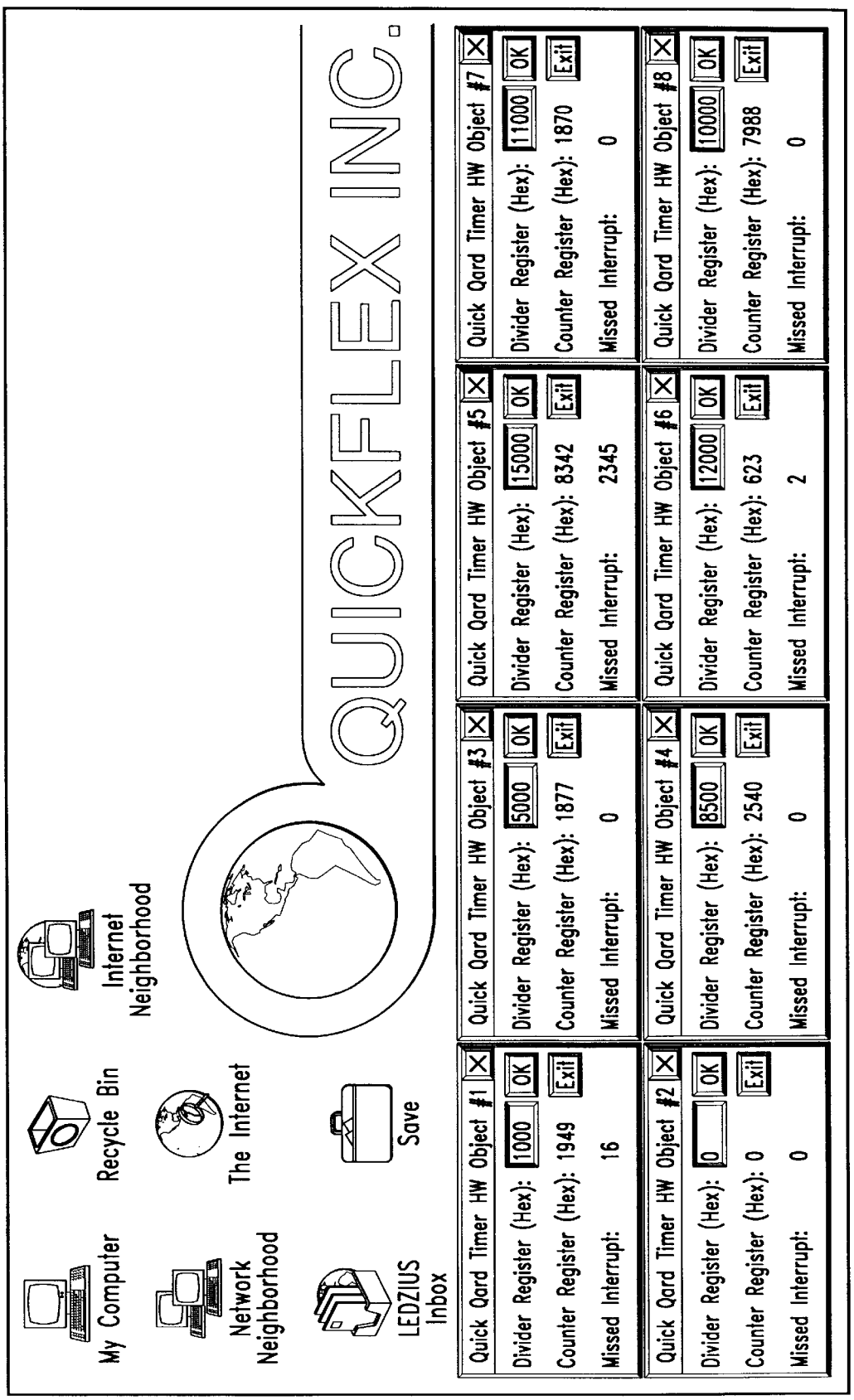
FIG. 9 is a print-out of the screen output for the application programs running the sample configuration file of FIGS. 6A–6C.

FIG. 9 is a print-out of the screen output for the application programs running the sample configuration file of FIGS. 6A–6C. FIG. 10 shows eight separate windows on a screen, one for each of the eight application programs, where each application program is using one of Quick Qard 26's timer hardware objects implemented in the sample configuration file. For each of the sample timer hardware objects a divider register, a counter register, and a count of the missed interrupts for that timer hardware object are provided. Although FIG. 10 is a simple example of the application output for a configuration file utilizing eight timer hardware objects, it is representative of the many and varied applications which can be used with the reconfigurable computing resource of the present invention.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A reconfigurable computing system for interfacing one or more application programs running on a host system to one or more hardware objects defined in one or more configuration files, comprising:

reconfigurable computing circuitry comprising flexibly configurable circuitry operable for interfacing to and implementing the one or more hardware objects with at least one of the one or more application programs;

memory circuitry associated with the reconfigurable computing circuitry for system information storage;

interfaces for communicatively connecting the reconfigurable computing circuitry and memory circuitry to the host system; and a reconfigurable computing software driver for managing, configuring and reconfiguring the reconfigurable computing system;

wherein each of the one or more hardware objects has an information block associated with each of the one or more configuration files in which said each of the one or more hardware objects is defined.

2. The reconfigurable computing system of claim 1, wherein said information blocks are stored in a separate header file included with the configuration file and accessible to the reconfigurable computing software driver.

3. The reconfigurable computing system of claim 1, wherein said information block consists of the following hardware object parameters:

hardware object number;

hardware object name;

hardware object version;

hardware object address offset;

hardware object interface address area size;

interrupt number;

hardware object type; and earliest compatible version number.

4. A reconfigurable computing method for interfacing one or more application programs running on a host system to one or more hardware objects defined in one or more configuration files, comprising:

initializing a reconfigurable computing software driver for managing, configuring and reconfiguring reconfigurable computing circuitry comprising flexibly configurable circuitry using the one or more configuration files;

communicatively connecting the reconfigurable computing circuitry and memory circuitry associated with the reconfigurable computing circuitry to the host system using one or more interfaces;

implementing the one or more hardware objects in the reconfigurable computing circuitry;

storing a plurality of system information in the memory circuitry; and interfacing the one or more hardware objects with at least one of the one or more application programs using the reconfigurable computing software driver;

further comprising the step of storing an information block for each of the one or more hardware objects in a header associated with each of the one or more configuration files in which the hardware object is defined for access by the reconfigurable computing software driver.

5. The reconfigurable computing method of claim 4, wherein said information blocks are stored in a separate header file included with the configuration file and accessible to the reconfigurable computing software driver.

6. The reconfigurable computing method of claim 4, further comprising the step of accessing the information stored in said information blocks for each of the one or more hardware objects with the reconfigurable computing software driver for interfacing the one or more hardware objects to at least one of the one or more application programs.

7. The reconfigurable computing method of claim 6, further comprising the step of the reconfigurable computing software driver identifying said each of the one or more hardware objects requested by the one or more application programs by name and version for interfacing said each of the one or more hardware objects with the one or more application programs.

8. The reconfigurable computing method of claim 7, further comprising accessing a hardware object header information table with the reconfigurable computing software driver to more quickly identify said each of the one or more hardware objects by name and version.

9. The reconfigurable computing method of claim 1, further comprising the steps of:

translating memory address offsets for each of the one or more hardware objects for at least one of the one or more application programs using the reconfigurable computing software driver; and passing a handle to the at least one of the one or more application programs for interfacing with the one or more hardware objects to provide for relocatable hardware object addressing.

10. The reconfigurable computing method of claim 1, further comprising the step of establishing interrupts for the one or more hardware objects through a single host system hardware interrupt line with the reconfigurable computing software driver using an interrupt flag and enable registers.

11. The reconfigurable computing method of claim 10, further comprising the steps of:

assigning an application program interrupt event service routine to at least one of the one or more hardware objects the at least one of the one or more application programs is interfaced with; and executing said interrupt event service routine using the reconfigurable software driver in the event an interrupt condition is detected at said at least one of the one or more hardware objects interfacing with said at least one or more application programs.

12. A reconfigurable computing method for interfacing one or more application programs running on a host system to one or more hardware objects defined in one or more configuration files, comprising:

initializing a reconfigurable computing software driver for managing, configuring and reconfiguring reconfigurable computing circuitry comprising flexibly configurable circuitry using the one or more configuration files;

communicatively connecting the reconfigurable computing circuitry and memory circuitry associated with the reconfigurable computing circuitry to the host system using one or more interfaces;

implementing the one or more hardware objects in the reconfigurable computing circuitry;

storing a plurality of system information in the memory circuitry; and interfacing the one or more hardware objects with at least one of the one or more application programs using the reconfigurable computing software driver; wherein the reconfigurable computing circuitry further comprises at least one Field Programmable Gate Array ("FPGA") providing reconfigurable logic for the one or more configuration files to define the one or more hardware objects;

and wherein said one or more configuration files further comprise a plurality of versions of each of the one or more configuration files, and wherein each configuration file in said plurality of versions provides the same or similar functionality and is targeted for configuring a different type of the at least one FPGA.

13. The reconfigurable computing method of claim 12, further comprising the step of determining the appropriate configuration file from said plurality of versions of each of the one or more configuration files for use with a given hardware object and circuitry configuration.

14. A reconfigurable computing method for interfacing one or more application programs running on a host system to one or more hardware objects defined in one or more configuration files, comprising:

initializing a reconfigurable computing software driver for managing, configuring and reconfiguring reconfigurable computing circuitry comprising flexibly configurable circuitry using the one or more configuration files;

communicatively connecting the reconfigurable computing circuitry and memory circuitry associated with the reconfigurable computing circuitry to the host system using one or more interfaces;

implementing the one or more hardware objects in the reconfigurable computing circuitry;

storing a plurality of system information in the memory circuitry; and interfacing the one or more hardware objects with at least one of the one or more application programs using the reconfigurable computing software driver;

further comprising the steps of storing a plurality of hardware object resource information in the reconfigurable computing circuitry and determining, using the reconfigurable computing software driver, if any of the one or more hardware objects meet the requirements requested by the one or more application programs.

15. The reconfigurable computing method of claim 14, further comprising the step of determining using the reconfigurable computing software driver whether an available version of at least one of the one or more hardware objects is compatible with the hardware object version requested by one of the one or more application programs.

16. A reconfigurable computing system for interfacing one or more application programs running on a host system to one or more hardware objects defined in one or more configuration files, comprising:
- a reconfigurable computing software driver for managing, configuring and reconfiguring reconfigurable computing circuitry comprising flexibly configurable circuitry using the one or more configuration files;
- instructions for interfacing the reconfigurable computing circuitry and memory circuitry associated with the reconfigurable computing circuitry to the host system using one or more interfaces;
- instructions for implementing the one or more hardware objects in the reconfigurable computing circuitry; and
- instructions for storing a plurality of system information in the memory circuitry;
- further comprising instructions for storing an information block for each of the one or more hardware objects in a header associated with each of the one or more configuration files in which the hardware object is defined for access by the reconfigurable computing software driver.

17. The reconfigurable computing system of claim 16, wherein said information blocks are stored in a separate header file included with the configuration file and accessible to the reconfigurable computing software driver.

18. The reconfigurable computing system of claim 16, wherein the reconfigurable computing software driver further comprises instructions for accessing the information stored in said information block for each of the one or more hardware objects for interfacing the one or more hardware objects to at least one of the one or more application programs.

19. The reconfigurable computing system of claim 18, wherein the reconfigurable computing software driver further comprises instructions for identifying said each of the one or more hardware objects requested by the one or more application programs by name and version for interfacing said each of the one or more hardware objects with the one or more application programs.

20. The reconfigurable computing system of claim 19, wherein the reconfigurable computing software driver further comprises instructions for accessing a hardware object header information table to more quickly identify said each of the one or more hardware objects by name and version.

21. A reconfigurable computing system for interfacing one or more application programs running on a host system to one or more hardware objects defined in one or more configuration files, comprising:
- a reconfigurable computing software driver for managing and reconfiguring reconfigurable computing circuitry comprising flexibly configurable circuitry using the one or more configuration files;
- instructions for interfacing the reconfigurable computing circuitry and memory circuitry associated with the reconfigurable computing circuitry to the host system using one or more interfaces;
- instructions for implementing the one or more hardware objects in the reconfigurable computing circuitry; and
- instructions for storing a plurality of system information in the memory circuitry;
- wherein the reconfigurable computing software driver further comprises:
  - instructions for translating memory address offsets for each of the one or more hardware objects for at least one of the one or more application programs; and
  - instructions for passing a handle to the at least one of the one or more application programs for interfacing with the one or more hardware objects to provide for relocatable hardware object addressing.

22. A reconfigurable computing system for interfacing one or more application programs running on a host system to one or more hardware objects defined in one or more configuration files, comprising:
- a reconfigurable computing software driver for managing, configuring and reconfiguring reconfigurable computing circuitry comprising flexibly configurable circuitry using the one or more configuration files;
- instructions for interfacing the reconfigurable computing circuitry and memory circuitry associated with the reconfigurable computing circuitry to the host system using one or more interfaces;
- instructions for implementing the one or more hardware objects in the reconfigurable computing circuitry; and
- instructions for storing a plurality of system information in the memory circuitry;
- wherein the reconfigurable computing software driver further comprises instructions for establishing interrupts for the one or more hardware objects through a single host system hardware interrupt line using an interrupt flag and enable registers.

23. The reconfigurable computing system of claim 22, wherein the reconfigurable computing software driver further comprises:
- instructions for assigning an application program interrupt event service routine to at least one of the one or more hardware objects that the at least one of the one or more application programs is interfaced with; and
- instructions for executing said interrupt event service routine in the event an interrupt condition is detected at said at least one of the one or more hardware objects interfacing with said at least one or more application programs.

24. A reconfigurable computing system for interfacing one or more application programs running on a host system to one or more hardware objects defined in one or more configuration files, comprising:
- a reconfigurable computing software driver for managing, configuring and reconfiguring reconfigurable computing circuitry comprising flexibly configurable circuitry using the one or more configuration files;
- instructions for interfacing the reconfigurable computing circuitry and memory circuitry associated with the reconfigurable computing circuitry to the host system using one or more interfaces;
- instructions for implementing the one or more hardware objects in the reconfigurable computing circuitry; and
- instructions for storing a plurality of system information in the memory circuitry;
- wherein the reconfigurable computing circuitry further comprises at least one Field Programmable Gate Array ("FPGA") providing reconfigurable logic for the one or more configuration files to define the one or more hardware objects;
- and wherein said one or more configuration files further comprise a plurality of versions of each of the one or more configuration files, wherein each configuration file in said plurality of versions provides the same or similar functionality and is targeted for configuring a different type of the at least one FPGA.

25. The reconfigurable computing system of claim 24, wherein the reconfigurable computing software driver further comprises instructions for determining the appropriate configuration file from said plurality of versions of each of the one or more configuration files for use with a given hardware object and circuitry configuration.

26. A reconfigurable computing system for interfacing one or more application programs running on a host system to one or more hardware objects defined in one or more configuration files, comprising:

a reconfigurable computing software driver for managing, configuring and reconfiguring reconfigurable computing circuitry comprising flexibly configurable circuitry using the one or more configuration files;

instructions for interfacing the reconfigurable computing circuitry and memory circuitry associated with the reconfigurable computing circuitry to the host system using one or more interfaces;

instructions for implementing the one or more hardware objects in the reconfigurable computing circuitry; and instructions for storing a plurality of system information in the memory circuitry;

further comprising instructions for storing a plurality of hardware object resource information in the reconfigurable computing circuitry, and wherein the reconfigurable computing software driver further comprises instructions for determining if any of the one or more hardware objects meet the requirements requested by the one or more application programs.

27. The reconfigurable computing system of claim 26, wherein the reconfigurable computing software driver further comprises instructions for determining whether an available version of at least one of the one or more hardware objects is compatible with the hardware object version requested by one of the one or more application programs.

28. A method of creating an interface between an application program and a programmable hardware device in a host system, comprising:

(a) executing the application program, the application program requesting a hardware object by function name by communicating data to a piece of software, the function name being independent of a particular physical hardware embodiment, the software being capable of accessing a database that includes configuration files;

(b) selecting one of the configuration files in the database based upon the data sent from the application program; and (c) reconfiguring the programmable hardware device by using the selected configuration file to enable use of the hardware object requested by the application program; wherein the requested hardware object is included in more than one of the configuration files, and wherein the software selects the configuration file according to what type of hardware is available on the host system.

29. A method of managing the allocation of reconfigurable computing resources in a host system, comprising:

(a) receiving a request from an application program for a hardware object by function name, the function name being independent of a particular physical hardware embodiment;

(b) searching a data storage unit that contains configuration files in response to the request, the configuration files each comprising data for programming a reconfigurable hardware device to perform a hardware function;

(c) selecting one of the configuration files according to the request from the application program; and (d) reconfiguring the reconfigurable hardware device by using the selected configuration file;
wherein the configuration files comprise header information related to functional characteristics of the configuration files, and further comprising using at least a portion of the header information to match the requested function name with the selected configuration file.

30. The method of claim 29, wherein the header information comprises at least two of the following hardware object parameters: (a) hardware object number; (b) hardware object name; (c) hardware object author; (d) hardware object version; (e) earliest compatible version number; (f) hardware object address offset; (g) hardware object interface address area size; (h) hardware object type; and (i) interrupt number.

31. The method of claim 29, wherein the header information comprises at least one hardware object parameter and at least one configuration file parameter.

* * * * *